Jan. 17, 1967   W. L. DARNELL   3,298,467
CASTER BRAKE
Filed Oct. 12, 1964
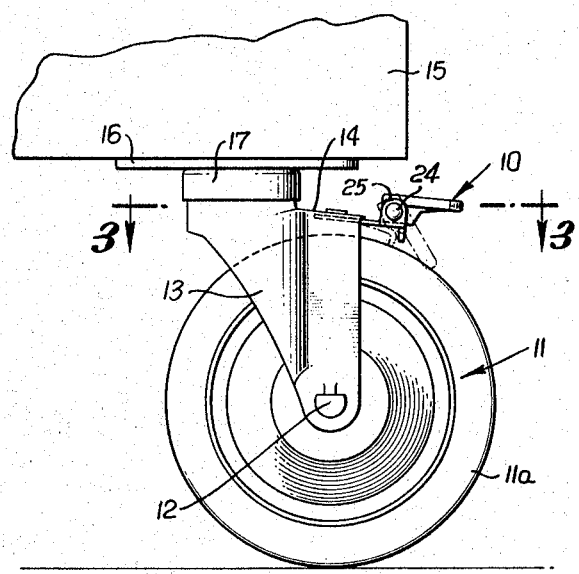
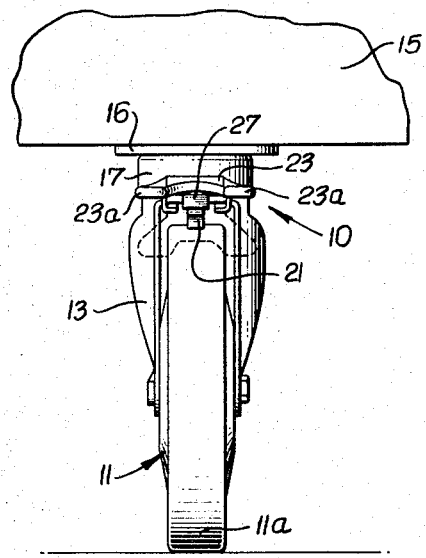
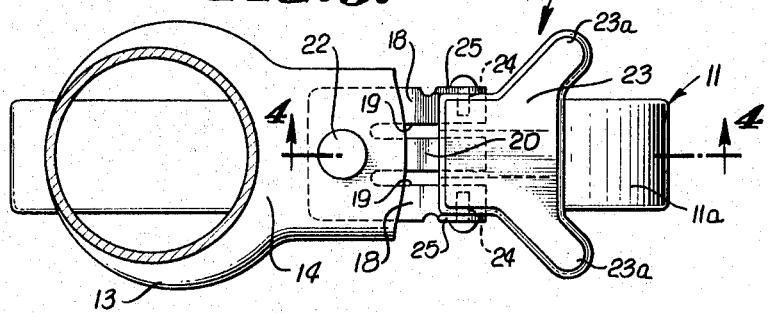
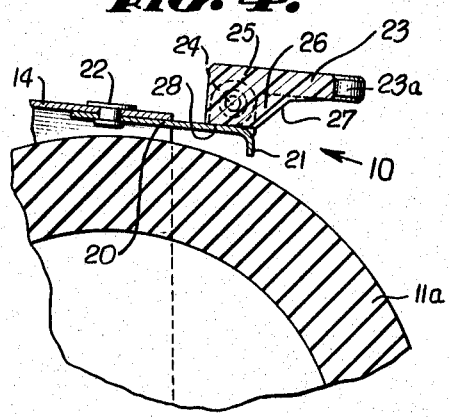
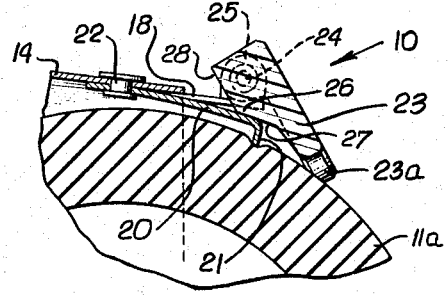
INVENTOR.
WILLIAM L. DARNELL
by White & Haefliger
ATTORNEYS.

United States Patent Office 3,298,467
Patented Jan. 17, 1967

3,298,467
CASTER BRAKE
William L. Darnell, Long Beach, Calif., assignor to Darnell Corporation, Ltd., Downey, Calif., a corporation of Delaware
Filed Oct. 12, 1964, Ser. No. 403,176
10 Claims. (Cl. 188—29)

This invention relates to improvements in braking devices for caster wheels of the type accommodated for rotation within a yoke, and has for its general object to provide a novel form of brake characterized by its extreme simplicity, durability and facility for either hand or foot actuation.

More particularly, the invention contemplates a novel braking device useable mainly for rubber or other non-metallic tire casters, in which the caster yoke serves to mount a simple arrangement of a resiliently flexible braking element positioned outwardly from the yoke to overlie the wheel, and a hand or foot actuable lever capable of flexing the element into secure braking engagement with the wheel. Preferably employed is a toggle type lever having rotatable over-center engagement with the braking element to afford its positively smooth application to the wheel and assured retention therewith against unintended release by wheel rotation in either direction.

In its more specific aspects the invention achieves these features and objects by a braking device comprising a simple plate secured to the top of the yoke and having split portions overlying the wheel and serving respectively to provide an integral resiliently flexible braking tongue and pivotal mounting for an overlying lever which is hand or foot reversely rotatable to flex the tongue against the wheel and to permit its release. An effectively balanced structure is achieved by a mounting plate dual split configuration permitting pivoting of the lever at opposite sides of the braking tongue, and forming the lever with an over-center lug bearing downwardly against the tongue between the pivots.

All the features and objects of the invention, as well as the details of an illustrative embodiment, will be fully understood from the following description of the accompanying drawing, in which:

FIG. 1 is a view showing in side elevation an illustrative caster and the brake mechanism;

FIG. 2 is a right side elevation of FIG. 1;

FIG. 3 is an enlarged plan view of the brake device taken on line 3—3 of FIG. 1; and FIGS. 4 and 5 are fragmentary enlarged sections showing respectively the brake released from and applied to the caster wheel.

In FIGS. 1 and 2, the braking device generally indicated at 10 is shown to be carried by a conventional type caster, which may be of a swivel or non-swivel type, having a wheel 11 rotatable at 12 within a yoke 13 which straddles the wheel at opposite sides of a top web portion 14 of the yoke. The wheel carries a tire 11a of rubber or other conventional tire material. The yoke may be adapted for connection to or association with a supported load 15 in any suitable manner, as by a flanged plate 16 in relation to which, in a swivel caster, the yoke is rotatable within its neck bearing 17, or the yoke may have a conventional spindle attachment to the load.

In the specific form illustrated, the brake device 10 is shown to comprise a metallic plate 18 having parallel open end slots 19 defining between them the locking element in the form of a flexible tongue 20 resiliently resistive to downward deflection. The tongue terminal 21 may desirably be formed essentially as a claw adapted by reason of its bent configuration to deflectively penetrate the surface of the wheel tire 11a in the locked condition of the brake appearing in FIG. 5.

Plate 18 may be mounted to the top portion of the yoke in any suitable manner, preferably as by riveting at 22 or otherwise securing the inner end of the plate to the underside of the yoke web 14. Thus oriented in relation to the yoke the slotted free end of the plate projects out in overlying relation to the wheel. Portions 18 of the plate at the outsides of the splits 19 serve to mount a locking-type actuator for the brake tongue 20. Preferably I employ a toggle or over-center type actuator in the form of a lever 23 pivoted at 24 to bracket ears 25 bent upwardly from the mounting plate metal. The lever 23 has an undersurface lug configuration at 26, having clearance from the side portions 18 of the plate, the lug presenting angularly converging surfaces 27 and 28 all oriented in relation to the pivot 24 so that in the FIG. 4 raised position of the lever, the tongue engages against surface 28 and free from the wheel, whereas when swung down to the FIG. 5 position, the lug portion 26 of the lever cams the tongue down against the wheel surface, at which position the tongue and lever remain by reason of the tongue engagement with surface 27, until the lever is intentionally released. Thus the tongue 20 is caused to respond in deflection between its released and locking positions, to an over-center movement and engagement by the lever.

The lever advantageously may be made of a non-metallic material such as nylon which has both smooth frictional engagement with the tongue in the lever camming action, and the capacity for maintaining the FIG. 5 locked condition of the lever. The latter is shown to have laterally extended wing portions 23a projecting outwardly beyond the side face planes of the wheel, so that the wings are conveniently accessible for foot contact in actuation of the lever between its released and locking positions.

I claim:

1. The combination of a caster including a wheel having a resiliently penetrable tire rotatable within a yoke having a top overlying the wheel, and a brake device comprising a one piece plate secured to and projecting outwardly from said top above the wheel, said plate having a pair of generally parallel splits separating the plate into transversely outer supporting portions and an intermediate tongue flexible downwardly into braking engagement with the wheel, and a lever pivotally mounted on said outer portions of the plate and operable to so flex the tongue.

2. The combination of claim 1, in which said tongue has a claw terminal operable to deflectively penetrate the tire surface.

3. The combination of claim 1, in which said lever has a lug having in relation to the axis of rotation of the lever, over-center rotatable engagement with the tongue.

4. The combination of claim 3, in which said lever projects laterally beyond the side planes of the wheel.

5. The combination of a caster including a wheel having a resiliently penetrable tire rotatable within a yoke, said yoke having a load supporting portion horizontally offset from the vertical plane of the wheel axis, and having an offset portion extending laterally from said load supporting portion and in overlying and straddling relation to the wheel and in said vertical axial plane thereof, and a brake device comprising a resiliently flexible braking element secured to and projecting from said offset portion of the yoke in overlying relation to the tire surface, and a lever associated with said element and operable to flex the element into braking engagement with the wheel at which said element deflectively penetrates the tire surface.

6. The combination of claim 5, including means for pivotally mounting said lever to said offset portion of the yoke.

7. The combination of claim 6, in which said lever includes means engaging and operable to flex said element between releasing and braking positions in over-center relation of the lever to its axis of rotation.

8. The combination of claim 5, in which said braking element has a downwardly directed claw terminal operable to deflectively penetrate the tire surface.

9. The combination of claim 5, in which said brake device is in the form of a split plate secured to and projecting outwardly from said offset portion of the yoke above the wheel, one integral portion of said plate forming said braking element as a resilient tongue having a downwardly directed claw and flexible downwardly to bring said claw into penetrating braking engagement with the wheel tire, and a lever pivotally carried by another portion of said plate and operable to so flex the tongue.

10. The combination of claim 9, in which said lever has over center engagement with the tongue in relation to the lever axis of rotation.

References Cited by the Examiner
UNITED STATES PATENTS

| | | |
|---|---|---|
| 2,138,433 | 11/1938 | Sunden. |
| 3,117,653 | 1/1964 | Altherr _____ 188—74 X |

DUANE A. REGER, *Primary Examiner.*